Aug. 7, 1956  J. C. PULLMAN ET AL  2,758,032
ANTIOXIDANT WRAPPER FOR FOODS
Filed Nov. 10, 1951
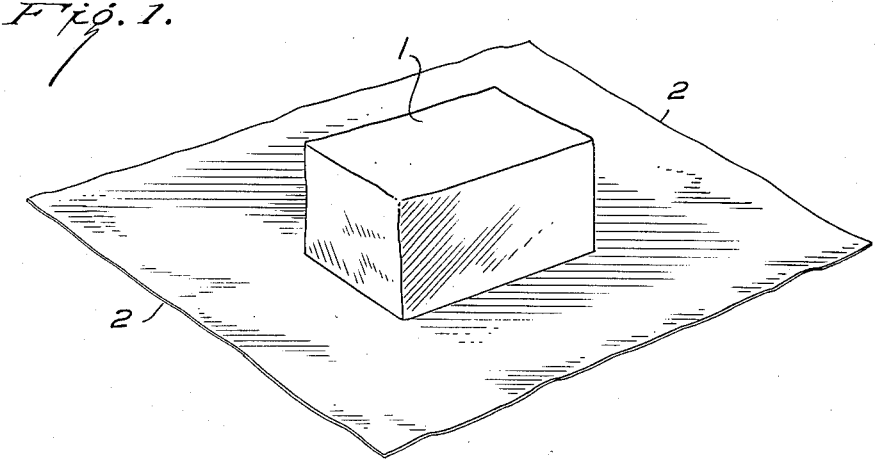
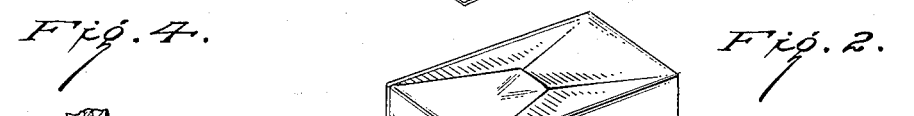
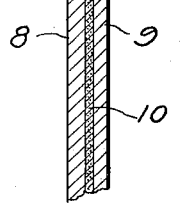
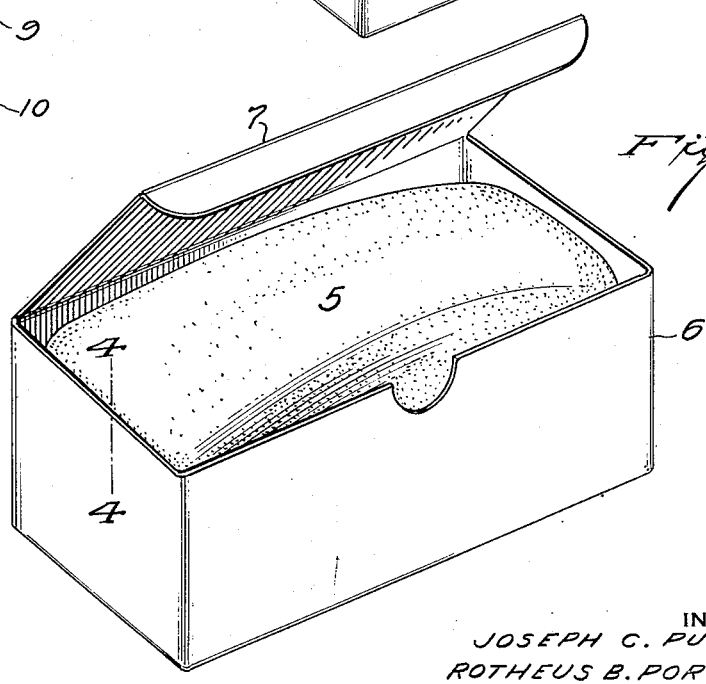
INVENTORS
JOSEPH C. PULLMAN,
ROTHEUS B. PORTER, JR.,
BY
Wm. P. Spielman
ATTORNEY

# United States Patent Office 2,758,032
Patented Aug. 7, 1956

2,758,032
ANTIOXIDANT WRAPPER FOR FOODS

Joseph C. Pullman, Stamford, and Rotheus B. Porter, Jr., Darien, Conn., assignors to American Cyanamid Company, New York, N. Y., a corporation of Maine Application November 10, 1951, Serial No. 255,792

2 Claims. (Cl. 99—179)

This invention is directed broadly to the protection of solid, semi-solid or plastic materials subject to rancidity against oxidative deterioration of this type. The invention deals primarily with the protection of foodstuffs and the like comprising fatty acid triglycerides against rancidity by a novel means of application of chemical oxidation inhibitors or antioxidants thereto. The invention also provides, as an additional specific feature, a novel type of protective antioxidant container for foods subject to oxidative deterioration.

The addition of chemical antioxidants, preservatives or oxidation inhibitors to organic materials subject to oxidative deterioration is of course well known. It has previously been suggested to incorporate small amounts of antioxidants into such materials as lard, hydrogenated fats, butter and other fatty acid triglyceride-containing materials, as well as into toilet soaps and the like. However, this practice involves several difficulties. In the case of edible materials the antioxidant must be both non-poisonous and tasteless, and should not impart an undesirable discoloration to the food. Antioxidants for toilet soaps, waxes and other organic materials intended to contact the human skin must be neither skin poisons nor irritants and must not cause dermatitis. In general, therefore, the incorporation of antioxidants or oxidation inhibitors directly into the materials to be protected has been open to numerous objections.

Our present invention is based on the process of applying a new class of antioxidants or oxidation inhibitors, not to the oxidation-sensitive organic material itself, but to the container in which this material is wrapped or otherwise enclosed. We find that by so applying the antioxidant, all of the above difficulties are overcome and a number of important advantages are obtained. First, the quantity of antioxidant can be materially reduced, since only the wrapper is impregnated therewith. Furthermore, a much wider variation in the type of antioxidant is permissible. Moreover, the question of solubility or dispersibility of the antioxidant in the oil, fat, soap, wax, carbohydrate or other material to be protected against rancidity is unimportant; in fact, in most cases a lack of solubility or penetration into the material to be protected is desirable.

The antioxidants which are incorporated into paper in accordance with our invention are the hindered phenols or cryptophenols that are hereinafter described as methylene bis-phenols and methylene tris-phenols. The methylene bis-phenols, which are particularly claimed herein, are typified by the compounds prepared as described in Examples 1 to 3 inclusive and by such compounds as 2,2'-methylene bis-(4,6-di-tert.butylphenol); 2,2'-methylene bis-(4-tert.butyl-6-methylphenol); 2,2'-methylene bis-(4,6-diamylphenols) as well as by the 2,2'-methylene bis-(4-methyl-6-alkylphenols) listed hereinafter in greater detail.

It will thus be seen that a principal object of our present invention is the provision of a method for protecting perishable organic materials, including particularly foodstuffs comprising fatty acid triglycerides, against rancidity by enclosing them in paper impregnated or coated uniformly with stabilizing quantities of an antioxidant or oxidation inhibitor. A further principal object is the provision of a protective antioxidant container for foods subject to oxidative deterioration, which container comprises paper composed of cellulosic fibers impregnated with an antioxidant, with or without a protective outer layer of cellophane, metal foil or other material. A still further object resides in the provision of specific methods for impregnating such protective containers with antioxidant, either by impregnation of the cellulosic fibers prior to their formation into paper, or by impregnation or soaking of the finished paper, or both. Still further objects, such as the application of the antioxidants to paper as wax sizes and the like, will become apparent from the following description of preferred embodiments of the invention when taken with the specific examples and the claims appended thereto.

The invention will be described in greater detail with reference to the accompanying drawing wherein:

Fig. 1 represents a block of edible fatty acid triglyceride-containing material such as butter or oleomargarine resting upon wrapping paper impregnated with antioxidant in accordance with the present invention.

Fig. 2 represents the materials of Fig. 1 in a closed package.

Fig. 3 represents a cake made with a triglyceride shortening, and therefore subject to rancidity, contained in a laminated cardboard box impregnated or coated with an antioxidant in accordance with another specific embodiment of the invention, and Fig. 4 is a cross section on the line 4—4 of Fig. 3, showing the lamination of the box.

Referring to Fig. 1 it will be understood that the block of foodstuff 1 may be butter, lard, oleomargarine, hydrogenated cotton seed oil or other hydrogenated fat, or any comparable material requiring protection against rancidity. The paper 2, in which the block 1 is to be wrapped in order to form the package 3 shown in Fig. 2 may be of any suitable type. As will be explained later this paper is, in accordance with the present invention, impregnated with a small quantity of a methylene bis- or tris-phenol antioxidant or oxidation inhibitor; suitable amounts being on the order of 0.01% to about 1%, based on the weight of the paper, and these quantities are hereinafter referred to as stabilizing amounts. When the paper wrapper 2 of Fig. 1 is folded about the block of perishable material, as in Fig. 2, it protects this material against oxidative deterioration, but without contaminating the material protected with antioxidant.

In some cases, as with foodstuffs composed largely or principally of carbohydrates, the container may be composed of paper board instead of ordinary paper, and such a container is illustrated in Figs. 3 and 4 of the drawings. A board container of this type may be desirable to protect the edible material from physical damage, as with cakes, pies, etc., as well as to provide protection against the gain or loss of moisture, as with most bakery goods. In Fig. 3 the cake indicated by reference numeral 5 is contained in a moisture vapor-proof box 6 having a tightly fitting top 7, both the box and the top being of laminated construction. As shown in Fig. 4, the laminated boxboard is composed of two or more layers of waterlaid cellulosic paper or board 8 and 9 carrying between them a laminating adhesive 10 which preferably is a microcrystalline wax carrying an organic colloid adhesive. It will be understood that the inner layer 9 may be impregnated or coated on its inner surface with antioxidant in accordance with the present invention, one preferred coating being the wax size emulsion described in Example 10. The cake 5 or other perishable contents of the box 6 will be protected to a substantial degree against rancidity and other forms of oxidative deterioration.

The methylene bis- and tris-phenols used in practicing the invention are prepared by condensing the desired phenol or phenol mixture with formaldehyde. Usually, in preparing bis-phenols, only a single phenol is used, thus producing a symmetrical compound. The tris-phenols, on the other hand, are ordinarily prepared from a mixture of para-cresol with a 2,4-dialkylphenol such as 2-isopropyl-4-methylphenol, 2-butyl-4-methylphenol and the like. Thus, for example, a tris-phenol such as 2,6 - bis - (2 - hydroxy - 3 - tert.butyl - 5 - methylbenzyl)-4-methylphenol is prepared by condensing a mixture of 1 mol of para-cresol and 2 mols of 2-tert.butyl-4-methylphenol with 2 mols of formaldehyde. Another similar tris-phenol that has been tested with success is 2,6 - bis - (2 - hydroxy - 3,5 - dimethylbenzyl) - 4 - methylphenol.

The preferred compounds used in practicing our invention are, however, the bis-phenols prepared from 2 mols of phenol and 1 mol of formaldehyde which are hereinafter described as 2,2'-methylene bis-(4,6-dialkylphenols). These compounds are prepared by condensing the corresponding 2,4-dialkylphenols with formaldehyde, preferably under acidic conditions. The condensation reaction is preferably carried out in the presence of an organic solvent such as heptane, solvent naphtha, and the like. Many of the condensation products can be recovered from these organic diluents by crystallization; in some cases, however, it is necessary to remove the solvent by vacuum distillation.

Typical 2,4-dialkylphenols that can be condensed with formaldehyde by the above-described procedure and used in practicing the invention are obtained by condensing para-cresol with olefins or aliphatic alcohols of 3–12 and preferably about 3–8 carbon atoms. Suitable Friedel-Crafts catalysts that may be employed for this condensation are aluminum chloride, zinc chloride, and concentrated sulfuric acid. Typical phenols that can be prepared by this method are 2-isopropyl-4-methylphenol, 2-secondary butyl-4-methylphenol, 2-tertiary butyl-4-methylphenol, 2-diisopropyl-4-methylphenol, 2-secondary octyl-4-methylphenol and 2-triisopropyl-4-methylphenol, which is prepared by condensing triisopropylene with para-cresol in the presence of a sulfuric acid catalyst. Any of these or other similar 2-alkylated para-cresols may be condensed with formaldehyde to form 2,2'-methylene bis-(4-methyl-6-alkylphenols) for use in practicing our invention.

We have also prepared and tested alkylidene bis-phenols that are closely related in structure to those used in practicing our invention, and have established that the compounds defined above are the most highly active. Thus, the antioxidant properties are greatly reduced, and the range of utility of the compounds is also reduced, if an ethylidene or propylidene bis-phenol is employed.

Although our invention is not limited by any theory of operation, the following is offered as our present understanding of the most probable reason why our antioxidant-impregnated protective wrappers are effective in inhibiting rancidity and other forms of oxidative deterioration in triglyceride-containing materials. It is well known that the deterioration of such materials is caused by a free-radical chain reaction in which molecular oxygen first combines with free radicals that may have been activated by light or heat or metallic ions such as copper and the like, with the formation of peroxides. These peroxide groups function as centers of polymerization or of further oxidation and decomposition and so catalyze the deterioration of the triglyceride-containing materials. By impregnating the wrapper with our cryptophenolic antioxidants, we inhibit the formation of peroxides at their very inception, and thus prevent their catalyzing action in accelerating oxidative deterioration in the butter, lard or other triglyceride-containing material.

Our invention will be further illustrated by the following specific examples. Since the preparation of many of the cryptophenolic antioxidants has not heretofore been described in the published literature, several specific examples thereof are given. It should be understood, however, that the invention in its broader aspects is not limited to these examples, but that variations and substitutions of equivalents may be resorted to within the scope of the appended claims.

*Example 1*

82 parts (0.5 mol) of 4-methyl-6-tertiary butylphenol, 10 parts of concentrated HCl, and 0.2 part of Duponol C are charged to a 500 ml. flask, 100 parts of heptane is added and the contents of the flask agitated while warming to 40° C. 23 parts of 36% aqueous formaldehyde solution, containing 8.25 parts (0.275 mol) of HCHO, are added dropwise so that the temperature does not exceed 60° C. The reaction mixture is digested at 50–60° C. for 3 hours, cooled to 20° C. and the solid product is collected on a filter. The product is slurried in 500 parts of water containing 20 parts of heptane and 0.25% Duponol, filtered, and dried. The product weighs 73 g.; M. P. 125–128° C.; yield 87%. The aqueous layer is separated from the mother liquor and discarded and 15 parts of fresh heptane is added with a fresh charge of 0.5 part of 4-methyl-6-tertiary butylphenol, 10 parts of concentrated HCl, and 0.2 part of Duponol C. Processing as above, 80 parts of product is obtained; M. P. 123–125° C.; yield 95%.

The formula of this compound is:

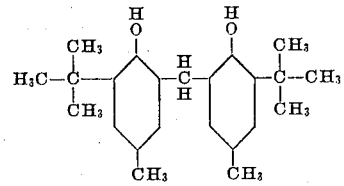

*Example 2*

200 g. (0.91 mol) of tertiary octylcresol is mixed with 10 g. of concentrated hydrochloric acid. 42 g. (0.46 mol) of 36% aqueous formaldehyde solution is added thereto and the reaction mixture heated for 1 hour at 55–60° C. The mixture becomes an unstirrable mass necessitating the addition of 250 cc. of heptane as diluent, after which the mixture is stirred for an additional 2 hours at 55–60° C. The product is then washed with water and the heptane-water mixture removed by azeotropic distillation. 123 g. of a substantially colorless viscous product is obtained. On crystallization from heptane a colorless product is obtained which has a melting point of 116–118° C. and has the following structure.

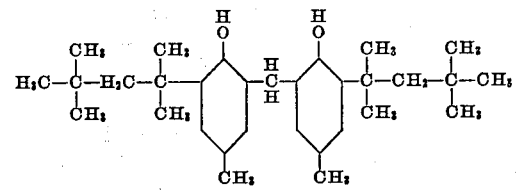

*Example 3*

A mixture of 45 grams (0.3 mol) of 2-isopropyl-4-methylphenol, 13.6 grams (1.65 mol) of the aqueous formalin, 30 cc. of a mixture of equal parts of water and solvent naphtha and 1.5 grams of concentrated sulfuric acid was heated at 95° C. for 2.5 hours. The resulting solution was neutralized with 25% sodium hydroxide solution and poured into water.

After standing for 16 hours the water was removed and the resinous material was dissolved in heptane and washed with water until it was neutral. The solution was then shaken with decolorizing carbon, filtered, and the solvent removed by heating to a temperature of 150° C. under 3 mm. of mercury pressure. The yield was 46 grams of an amorphous product that was insoluble in water and in aqueous alkalies but soluble in hydrocarbons and in triglyceride oils and fats.

Example 4

A dispersion of 7.6 parts by weight of sulfonated peanut oil and 0.4 part of methylcellulose was prepared in 50 parts of water containing 2 parts of a commercial sodium lauryl sulfate-sodium sulfate mixture sold as "Aquarex D." To this there was added 40 parts by weight of 2,2'-methylene bis-(4-methyl-6-tert.butylphenol) with strong agitation, which was continued until the antioxidant was dispersed to a particle size on the order of 0.5 micron.

Handsheets containing this antioxidant were made from bleached sulfite pulp on a laboratory handsheet machine. The pulp was suspended in water, beaten for about 1.5 hour and diluted to papermaking consistency with water buffered to a pH of 5. After adding the antioxidant dispersion the stock was agitated slowly for about 5 minutes; it was then precipitated on the fibers by addition of a solution of papermakers' alum. Where rosin sized sheets were made, the rosin size was added first and distributed uniformly by agitation, then the antioxidant emulsion was introduced and the alum was added last. The sheets were made by the usual laboratory sheetmaking machine and were dried for 2 minutes at 240° F. on a drum dryer.

The handsheets were cut into 2" x 3½" sections, each of which was impregnated uniformly with 0.25 gram of corn oil. The sections from each handsheet were then stacked, one on the other, in a glass pint jar which was loosely covered to permit access of air. The jars were placed in an oven heated at 212° F. for periods of 1 hour or ½ hour, cooled, and the odor of the contents noted. This procedure was repeated until a definite odor of rancidity was present.

The results of these tests are shown in the following table wherein the percent antioxidant is based on the dry weight of the paper fibers.

| No. | Percent Antioxidant | Hours of Heating to Develop— | |
|---|---|---|---|
| | | Sour Odor | Rancidity |
| 1 | None | 2 | 2.5 |
| 2 | 0.005 | 3 | 3.5 |
| 3 | 0.01 | 4 | 4.5 |
| 4 | 0.05 | 4.5 | 5.5 |
| 5 | 0.1 | 4.5 | 5.5 |

These figures show clearly the inhibiting effects of the antioxidant when applied to the aqueous pulp suspension from anionic dispersion.

Example 5

The procedure of Example 1 was repeated with the application of 2% of rosin size to the fibers and precipitation with 2% alum on the dry weight thereof. The test results were as follows:

| No. | Percent Antioxidant | Hours of Heating to Develop— | |
|---|---|---|---|
| | | Sour Odor | Rancidity |
| 1 | None | 3.5 | 4 |
| 2 | 0.03 | 5.5 | 6 |
| 3 | 0.05 | 7 | 7.5 |
| 4 | 0.07 | 8 | 8.5 |

A comparison of these figures with those of Example 1 shows the surprising fact that sizing the paper increases substantially the protection against rancidity.

Example 6

Handsheets were prepared from bleached sulfite pulp impregnated with a cationic dispersion of the antioxidant. This dispersion was prepared by first dissolving 3 grams of stearamidopropyl dimethylhydroxyethylammonium chloride, a cationic surface-active agent, in 56 grams of water and adding 47.5 grams of white mineral oil and 0.6 gram of methylcellulose with strong agitation. A quantity of the antioxidant weighing 35.75 grams was then added in finely divided condition and dispersed uniformly by stirring. The resulting composition was added to the aqueous paper pulp dispersion which was then allowed to stand at least 5 minutes before sheetmaking Rancidity tests on the handsheets were made by the procedure described in Example 1 with the following results:

| No. | Percent Antioxidant | Hours of Heating to Develop— | |
|---|---|---|---|
| | | Sour Odor | Rancidity |
| 1 | 0.01 | | 2.5 |
| 2 | 0.02 | 2.5 | 3.5 |
| 3 | 0.03 | 2.5 | 3.5 |
| 4 | 0.05 | 4 | 4.5 |

Similar tests were made on handsheets prepared from the same stock with the same antioxidant dispersion, but treated with 2% of rosin size and alum on the dry weight of the fiber. The results were as follows:

| No. | Percent Antioxidant | Hours of Heating to Develop— | |
|---|---|---|---|
| | | Sour Odor | Rancidity |
| 1 | 0.01 | 4 | 4.5 |
| 2 | 0.02 | 4.5 | 5.5 |
| 3 | 0.03 | 5 | 6 |
| 4 | 0.05 | 5.5 | 6 |

Again the increased stability against rancidity obtained by the antioxidant is shown, as well as the improvement resulting from the use of rosin size.

Example 7

Handsheets prepared from bleached sulfite pulp were impregnated with the antioxidant dispersion of Example 1 by "tub" application; i. e., by soaking the paper in a dilution of the antioxidant dispersion, passing it through rolls to remove excess slurry and air drying. In the headings of the table below "Percent Slurry" means the percent by weight of antioxidant in the slurry used, while "Coat Weight" means the total solids pickup of the impregnated paper expressed as pounds per ream.

The impregnated sheets were tested for rancidity by the procedure previously described with the results indicated in the following table. In samples Nos. 3 and 4 of this table no definite rancidity was obtained after 9 hours of accelerated aging, whereupon the test was stopped.

| No. | Percent Slurry | Coat Weight | Hours of Heating to Develop— | |
|---|---|---|---|---|
| | | | Sour Odor | Rancidity |
| 1 | None | | 2 | 2.5 |
| 2 | 0.5 | 1.05 | 5.5 | 6 |
| 3 | 1 | 1.94 | 7.5 | None |
| 4 | 2 | 2.89 | 9 | None |

These results show that a surface coating or impregnation of the paper inhibits oxidation and rancidity to a high degree. It was also noted that in this series the sour odor, and also the odor of rancidity in sample No. 2, was dispelled soon after opening the jars.

*Example 8*

A piece of fresh butter was enclosed in paper No. 4 of Example 5; i. e., in paper containing 0.07% by weight of antioxidant prepared with the addition of 2% rosin size and 2% alum. Another piece of butter of the same size was enclosed in a control paper made from the same stock but containing no antioxidant.

The two packages were placed in two quart glass jars which were then tightly capped. The jars were stored at 73° F. to about 80° F. and examined regularly for odor, with the results tabulated below. In the headings of the table "Antioxidant" means the package in which the paper contained 2,2'-methylene bis-(4-methyl-6-tert.-butylphenol).

| Days Storage | Butter Package Odor | |
|---|---|---|
| | Antioxidant | Control |
| 0 | Good | Good. |
| 3 | ----do---- | Do. |
| 5 | ----do---- | Do. |
| 7 | ----do---- | Fatty odor. |
| 10 | Sl. fatty odor | Rancid. |
| 11 | ----do---- | Do. |
| 12 | ----do---- | Do. |
| 13 | ----do---- | Do. |

These results show clearly that the presence of only a very small quantity of the antioxidant in the paper will prevent rancidity in butter under conditions where an unprotected sample becomes rancid.

*Example 9*

The antioxidant of Example 3 was dissolved in alcohol as 5, 10 and 15 percent solutions and these were applied to paperboard of the weight used in making the box shown in Fig. 3 of the drawings. Samples of the board were coated with the solutions by a rapid dip followed by squeezing the excess liquid from the surface and drying to remove the solvent.

Pieces of the treated boards were stacked with a drop of corn oil between each layer. The stacks were heated for 4 hours in glass jars at 212° F. and tested and rated as described in Example 4. The results were as follows:

| Alcohol Solution | Antioxidant in Board | Result |
|---|---|---|
| | *Percent* | |
| Control | None | Rancid odor. |
| 5% | 0.08 | Do. |
| 10% | 0.55 | Fatty odor. |
| 15% | 1.3 | Do. |

*Example 10*

The antioxidants of the present invention are soluble in paraffin and other hydrocarbon waxes and can be applied to paper as a solution therein. Thus, the product of Example 1 was dissolved in melted paraffin wax to a 2% solution and the wax was used in making a cationic emulsion by the following formulation:

| Material | Weight Percent |
|---|---|
| Methyl cellulose | 0.604 |
| Mineral oil | 4.746 |
| Stearamidopropyldimethylhydroxethyl ammonium chloride | 2.97 |
| Water | 55.92 |
| Wax solution | 35.76 |

This emulsion was diluted with water to 2% wax content and added in varying quantities to aqueous paper pulp suspensions which were then made into paper. Samples of the paper were tested as described in Example 9 with the results shown in the following table, wherein "Amount" means the percent of antioxidant based on the weight of the paper.

| Amount | Odor |
|---|---|
| 0.004 | Rancid. |
| 0.018 | Sl. Rancid. |
| 0.04 | Not Rancid. |
| 0.18 | Do. |

Another sample of the paraffin wax containing 2% of antioxidant was emulsified in water with the aid of a mixture of sodium naphthalene sulfonate and sodium lignin sulfonate. The resulting anionic wax emulsion was applied as a tub size to paperboard of the type used in the box of Fig. 3 of the drawings in amounts of 0.75% and 1.5%. The sized paperboard exhibited definite antioxidant properties when tested as described above.

What we claim is:

1. A protective package of triglyceride-containing material subject to oxidative deterioration comprising rosin-sized paper carrying 0.01% to 1% by weight of a 2,2'-methylene bis-(4,6-dialkylphenol) antioxidant, said paper enclosing said triglyceride-containing material and presenting thereto a surface containing said antioxidant.

2. A protective package as defined in claim 1 in which each 6-alkyl substituent is a hydrocarbon chain containing from 3 to 8 carbon atoms that is directly connected to the phenol nucleus at an intermediate carbon atom.

References Cited in the file of this patent

UNITED STATES PATENTS

| 2,233,172 | Loane | Feb. 25, 1941 |
| 2,309,079 | Mitchell | Jan. 19, 1943 |
| 2,515,907 | Stevens et al. | July 18, 1950 |
| 2,570,402 | Stevens et al. | Oct. 9, 1951 |